US 6,553,349 B1

(12) United States Patent
Goodwin, III

(10) Patent No.: US 6,553,349 B1
(45) Date of Patent: Apr. 22, 2003

(54) SYSTEM AND METHOD OF APPLYING PRICE CHANGES IN AN ELECTRONIC PRICE LABEL SYSTEM

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/115,477

(22) Filed: Jul. 15, 1998

(51) Int. Cl.[7] .............................. G06F 17/60; G08B 5/22
(52) U.S. Cl. .............................. 705/20; 705/16; 705/21; 705/26; 235/383; 235/375
(58) Field of Search .............................. 705/16, 20, 21, 705/26, 23; 235/383, 375

(56) References Cited

U.S. PATENT DOCUMENTS

| | | | |
|---|---|---|---|
| 4,002,886 A | 1/1977 | Sundelin | 235/61.7 R |
| 4,500,880 A | 2/1985 | Gomersall et al. | 340/825.35 |
| 4,843,546 A | 6/1989 | Yoshida et al. | 364/403 |
| 4,924,363 A | 5/1990 | Kornelson | 362/125 |
| 5,172,314 A | 12/1992 | Poland et al. | 364/401 |
| 5,448,226 A | 9/1995 | Failing, Jr. et al. | 340/825.35 |
| 5,544,041 A | 8/1996 | Nekomoto | 364/401 R |
| 5,632,010 A * | 5/1997 | Oechsle et al. | 345/1 |
| 5,729,696 A * | 3/1998 | Goodwin, III et al. | 395/222 |
| 5,812,985 A * | 9/1998 | Failing et al. | 705/5 |
| 5,870,714 A * | 2/1999 | Shetty et al. | 705/20 |
| 5,873,069 A * | 2/1999 | Reuhl et al. | 705/20 |

FOREIGN PATENT DOCUMENTS

| | | |
|---|---|---|
| EP | 708409 | 4/1996 |
| EP | 749091 | 12/1996 |
| EP | 837438 | 4/1998 |

OTHER PUBLICATIONS

Eldat Communication Ltd.; "Sainsbury's Chooses ICL and Eldat's GLOBALLabel ESL Solution", London, UK, Jul. 1998.*
Eldat Communication Ltd.; "ICL Retail Systems and Eldat Create GlobaLABEL", Dallas, Jun. 1998.*

* cited by examiner

Primary Examiner—Eric W. Stamber
Assistant Examiner—Anne Teitelbaum
(74) Attorney, Agent, or Firm—Paul W. Martin

(57) ABSTRACT

A system and method of applying price changes which minimizes price look-up file access attempts by using a separate file for daily price change information, including a new price, a date, a start time, and an end time. The system includes an electronic price label associated with the item and a computer for reading a record for the item in a price file, for obtaining daily price change information for the item from the record, for adding the daily price change information to another file different from the price file, and for processing the daily price change information in the other file by reading the daily price change information from the other file, sending a first message to the electronic price label at the start time including a command to display the new price, and sending a second message to the electronic price label at the end time including a command to display a regular price for the item from the price file.

5 Claims, 4 Drawing Sheets

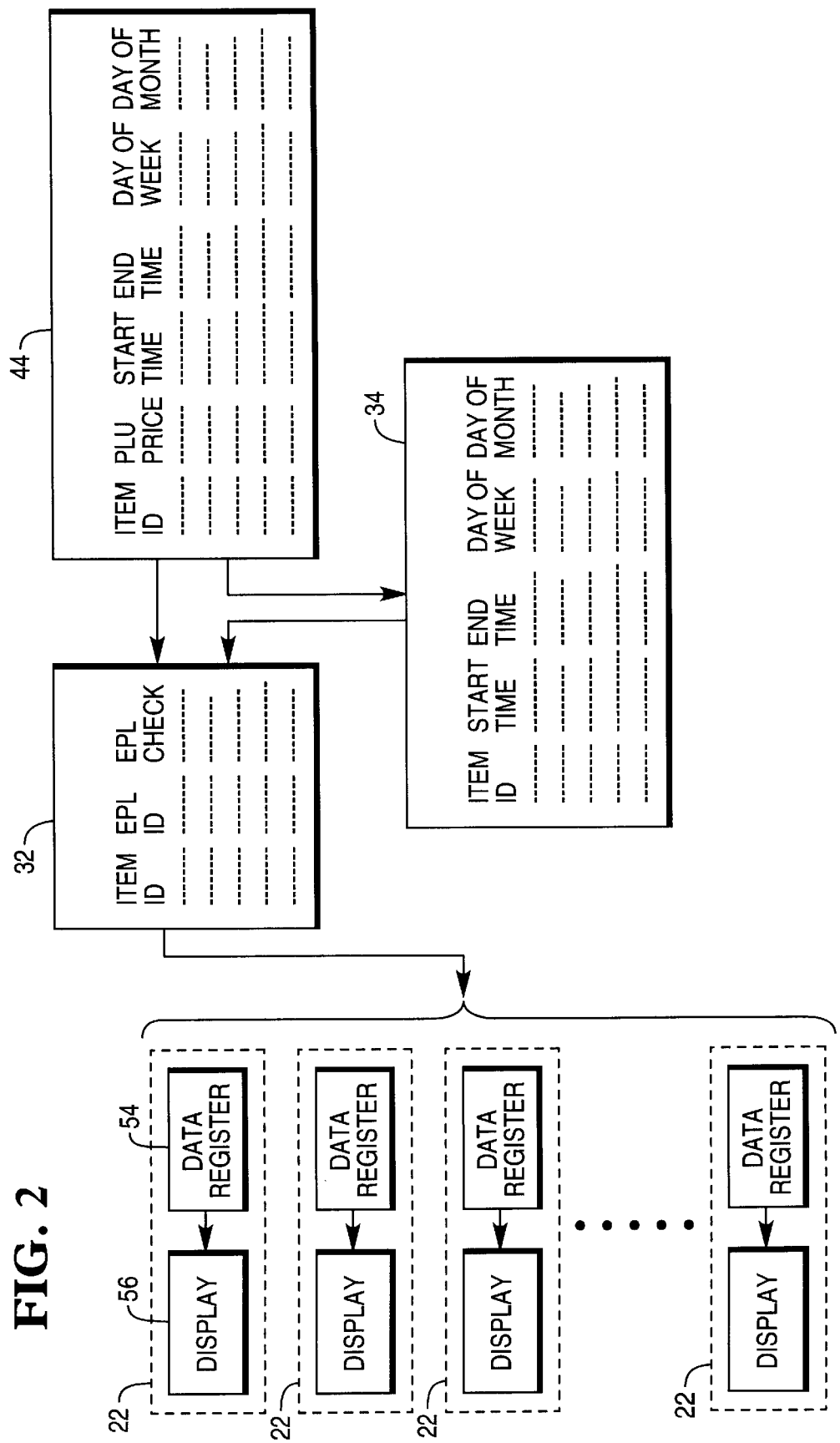

SYSTEM AND METHOD OF APPLYING PRICE CHANGES IN AN ELECTRONIC PRICE LABEL SYSTEM

BACKGROUND OF THE INVENTION

The present invention relates to electronic price label (EPL) systems, and more specifically to a system and method of applying price changes in an electronic price label system.

Point-of-sale (POS) transaction processing systems typically include a price look-up (PLU) file which contains item identification information and item price information.

EPL systems typically include a plurality of EPLs for merchandise items in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU data file and stored within an EPL price change record.

Current POS systems are not equipped to perform daily changes in PLU files. Instead, they use additional fields such as "SALE date", "SALE time begin", "SALE time end", and "SALE information". Since EPL price change records typically come from PLU files, EPL systems are not equipped to perform daily price changes either.

Therefore, it would be desirable to provide a system and method of handling daily price changes in EPL systems.

SUMMARY OF THE INVENTION

In accordance with the teachings of the present invention, a system and method of applying daily price changes in electronic price label (EPL) systems is provided.

The system includes an electronic price label associated with the item and a computer. The computer reads a record for the item in a price file, obtains daily price change information for the item from the record, adds the daily price change information to another file different from the price file, and processes the daily price change information in the other file. Processing involves reading the daily price change information from the other file, sending a first message to the electronic price label at the start time including a command to display the new price, and sending a second message to the electronic price label a the end time including a command to display a regular price for the item from the price file.

It is a feature of the present invention that the computer maintains a separate file for daily price change information in order to minimize price look-up file access attempts.

The method of the present invention includes the steps of reading a record for the item in a price file, obtaining daily price change information for the item from the record including a new price and a date and a start time and an end time, adding the daily price change information to another file different from the price file, reading the daily price change information from the other file, and sending a message to an electronic price label associated with the item at the start time including a command to display the new price.

It is accordingly an object of the present invention to provide a system and method of applying daily price changes in electronic price label (EPL) systems.

It is another object of the present invention to provide an EPL system which is capable of handling daily price changes.

It is another object of the present invention to provide an EPL system which uses a separate file for storing daily price changes in order to minimize price look-up file access attempts.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a diagram showing data files used within a transaction establishment.

DETAILED DESCRIPTION OF THE PREFERRED EMBODIMENT

Figure 1:
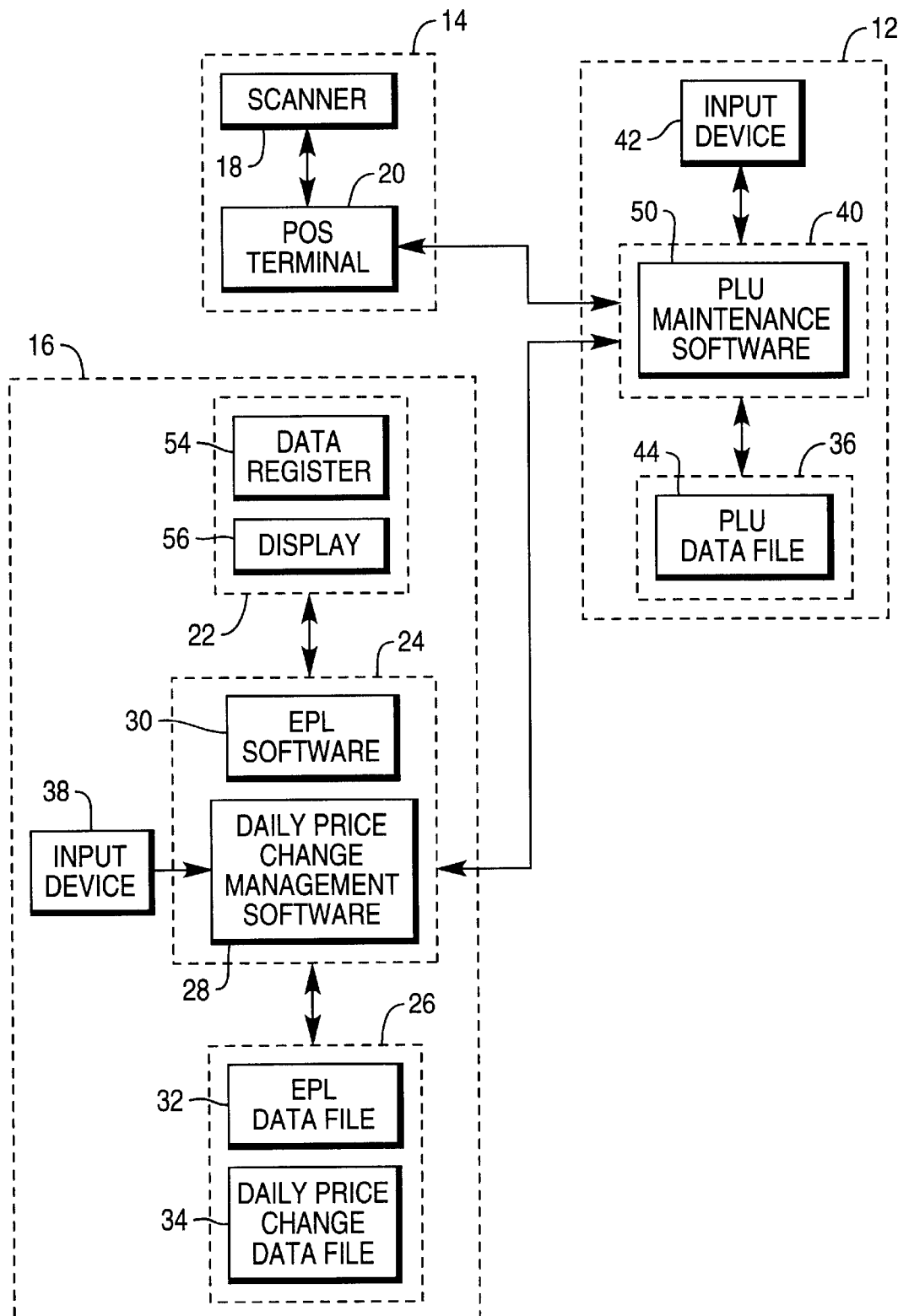
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and terminal 20.

EPL system 16 primarily includes EPLs 22, host EPL terminal 24, and EPL storage medium 26.

EPLs 22 include a data register 54 and a display 56. Data registers 54 contain data, usually price data, sent from EPL software 30. The data is typically displayed by displays 56.

Host EPL terminal 24 executes EPL software 30 and daily price change management software 28. To assist with execution of certain tasks performed by EPL software 30 and daily price change management software 28, EPL terminal 24 includes a built-in time keeping device, commonly referred to as a system clock, which is synchronized with current time, in order to automatically execute the tasks at their scheduled times.

EPL software 30 is responsible for scheduling and transmitting price data from EPL data file 32 to EPLs 22. EPL software 30 obtains prices in PLU data file 44 as they are entered in input device 42 (immediate processing) or after they have been stored within PLU data file 44. EPL software 30 also schedules and transmits daily price data under the control of daily price change data management software 28.

Daily price change management software 28 automatically reads PLU data file 44 on at least a daily basis and stores daily price change data within daily price change data file 34. Daily price change information may also be recorded from an operator by input device 38, which is preferably a keyboard. Daily price change management software 28 also works in connection with EPL software 30 to automatically schedule and transmit daily price change data from daily price change data file 34 to appropriate EPLs 22.

However, the present invention also envisions one large file which combines daily price change data file 34 and PLU data file 44, although this would be less efficient. PLU data file 44 has thousands of items (most stores have greater than thirty thousand items on file). Daily price change data file 34 is much smaller (most likely less than a thousand items). Additionally, PLU data file 44 is set for speed reads based on a PLU number (UPC or EAN type), while daily price change data file 34 is set for speed reads based on Start and End date and times. This is accomplished via different indexing. Therefore, it is much more efficient to regularly pass through daily price change data file 34 instead of PLU data file 44. PLU data file 44 is accessed only once in a while.

EPL storage medium 26 stores EPL data file 32 and daily price change data file 34 and is preferably a fixed disk drive. EPL data file 32 contains EPL identification and price checksum information. Price checksum information is calculated from price information in PLU data file 44.

EPL data file 32 contains current information displayed by EPLs 22. Daily price change data file 34 contains daily price information to be displayed by EPLs 22. Although disclosed as separate files, both files could be combined into a single file.

Host computer system 12 includes PLU storage medium 36, host PLU terminal 40, and input device 42.

PLU storage medium 36 stores PLU data file 44. PLU data file 44 also contains information contained within daily price change data file 34. PLU data file 44 is available for distribution to POS terminal 20. Alternatively, provision may be made for direct access to PLU data file 44 by bar code reader 18.

Host PLU terminal 40 (PLU) maintenance application 48, which includes PLU maintenance routine 50. PLU maintenance routine 50 updates PLU data file 44 upon operator input.

Input device 42 is preferably a keyboard.

Turning now to FIG. 2, EPL data file 32, daily price change data file 34, and PLU data file 44 are shown in more detail.

EPL data file 32 includes a line entry for each EPL 22 in EPL system 16. Each line entry has an item identification entry (ITEM ID), an EPL identification entry (EPL ID), and an EPL price checksum value entry (EPL CHECK).

Entry ITEM ID identifies a store item. Entry EPL ID identifies which EPL is assigned to the item. Entry EPL CHECK is a checksum value of the digits of the price information that is displayed by display 56.

PLU data file 44 includes a line entry for each item sold in the store. Each line entry has an item identification entry (ITEM ID), a PLU price entry (PLU PRICE). Items which are subject to daily price changes include line entries for a special price start time (START TIME), a special price end time (END TIME), a day of week indicator (DAY OF WEEK), and a day of month indicator (DAY OF MONTH).

Entry ITEM ID identifies a store item. Entry PLU PRICE identifies the price read by POS system 14 to determine the price of each item during scanning by bar code reader 18. Entry START TIME identifies a time when the special price begins. Entry END TIME identifies a time when the special price ends. Entry DAY OF WEEK identifies what day of the week the special price begins. Entry DAY OF MONTH indicates which day of the month the special price begins.

Daily price change data file 34 duplicates the daily price change information in PLU data file 44. Each line entry has an item identification entry (ITEM ID), a special price start time (START TIME), a special price end time (END TIME), a day of week indicator (DAY OF WEEK), and a day of month indicator (DAY OF MONTH).

Entry ITEM ID identifies a store item. Entry START TIME identifies a time when the special price begins. Entry, END TIME identifies a time when the special price ends. Entry DAY OF WEEK identifies what day of the week the special price begins. Entry DAY OF MONTH indicates which day of the month the special price begins.

During normal operation, EPL terminal 24 obtains price information from PLU data file 44 and sends it to data register 54. Display 56 displays the price in data register 54.

Daily price change management software 28 reads PLU data file 44 on a daily basis, identifies newly recorded specials, writes the specials into daily price change data file 34, and deletes obsolete specials in daily price change data file 34. Daily price change management software 28 applies daily specials automatically at the times and days listed in daily price change data file 34 and automatically removes specials at the end times listed in daily price change data file 34. Daily price change management software 28 applies and removes special prices by causing EPL software 30 to identify EPLs 22 associated with the special items using EPL data file 32 and schedule and transmit price change messages to the associated EPLs 22 at the start and end times.

Figure 3A:
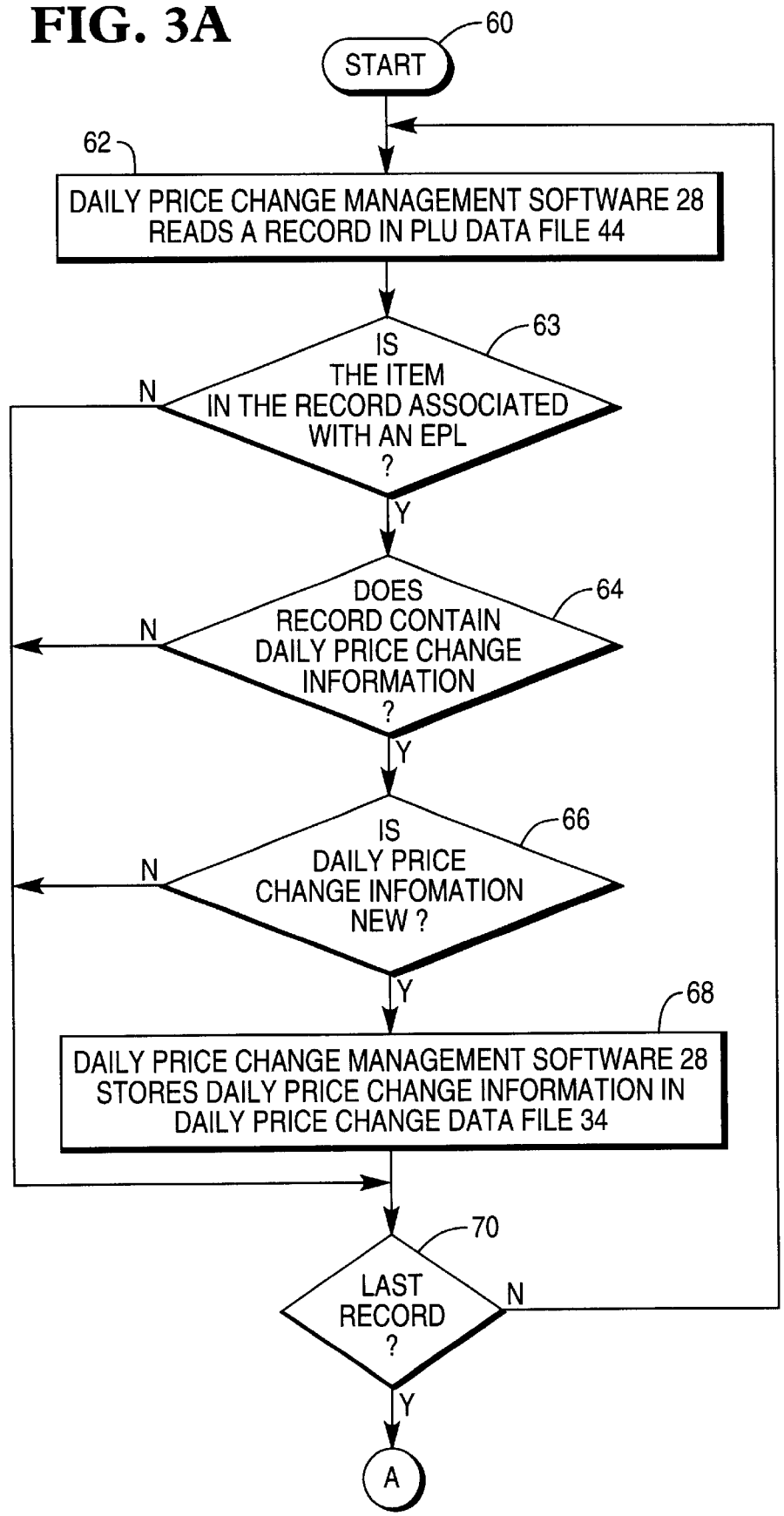
FIGS. 3A and 3B form a flow diagram illustrating the method of the present invention.
Figure 3B:
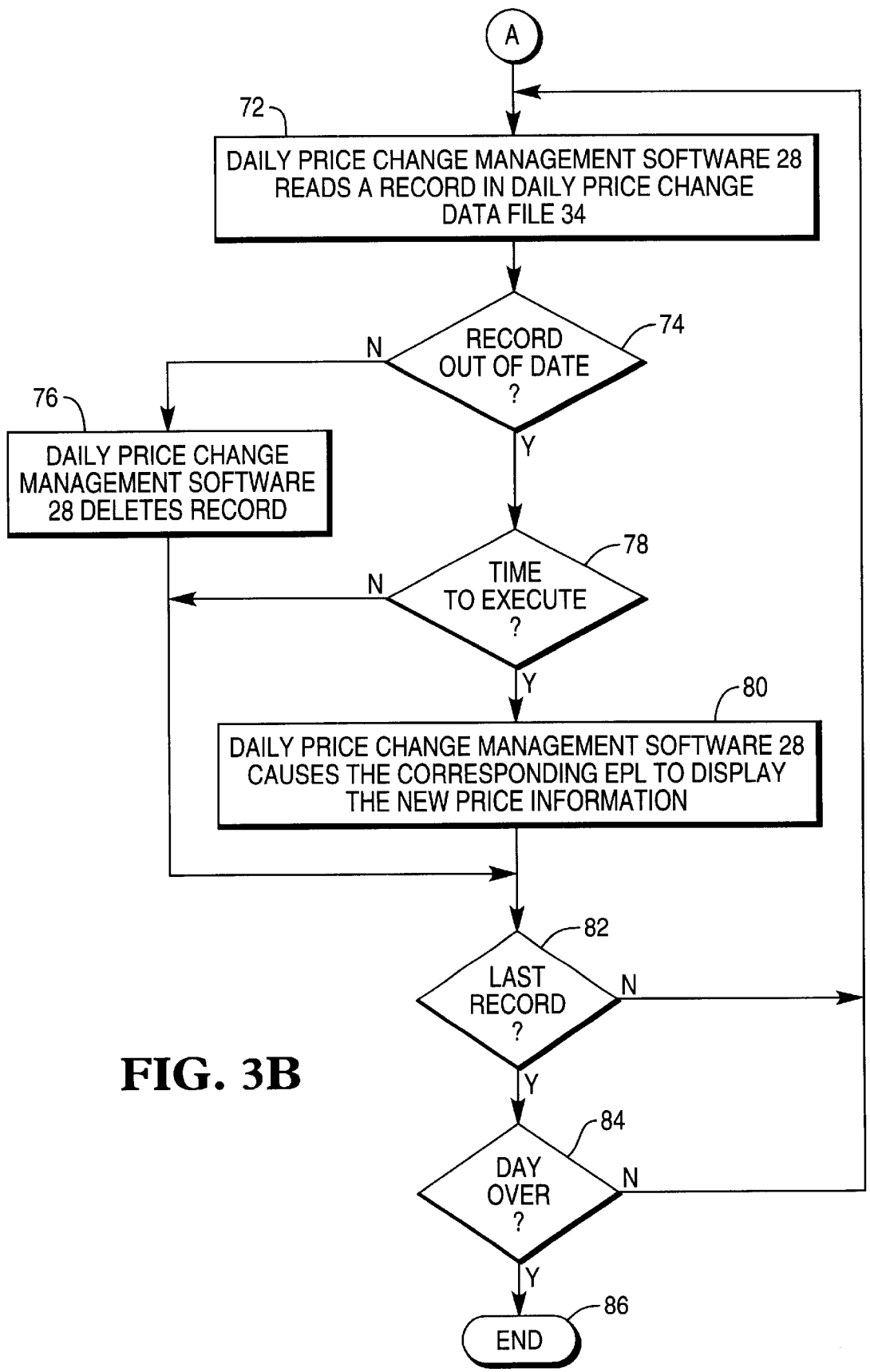

Turning now to FIGS. 3A and 3B, the operation of daily price change management software 28 is discussed in more detail beginning with START 60.

In step 62, daily price change management software 28 reads a record in PLU data file 44.

In step 63, daily price change management software 28 determines whether an EPL is associated with the item in the record. If not, operation proceeds to step 70. If so, then operation proceeds to step 64.

In step 64, daily price change management software 28 determines whether the record contains daily price change information (START TIME) If not, operation returns to step 70. If so, then operation proceeds to step 66.

In step 66, daily price change management software 28 determines whether the daily price change information is new information. If not, operation proceeds to step 70. If so, operation proceeds to step 68.

In step 68, daily price change management software 28 adds the new PLU data file items and their daily price change information to daily price change data file 34.

In step 70, daily price change management software 28 determines whether the record is the last record in PLU data file 44. If not, operation returns to step 62 to read the next record. If so, operation proceeds to step 72.

In step 72, daily price change management software 28 reads a record in daily price change data file 34.

In step 74, daily price change management software 28 determines whether the record is out of date. If so, daily price change management software 28 deletes the record in step 76 and operation proceeds to step 82. If not, operation proceeds to step 78.

In step 78, daily price change management software 28 determines whether the execution time in the record has been reached. Here, execution time means either the START TIME or END TIME entries. If not, operation proceeds to step 82. If so, operation proceeds to step 80.

In step 80, daily price change management software 28 causes EPL software 30 to display the new price information. EPL software 30 uses the ITEM ID information provided by daily price change management software 28 to obtain EPL address information from EPL data file 32.

In step 82, daily price change management software 28 determines whether record is the last record. If not, operation returns to step 72 to read another record. If so, operation proceeds to step 84.

In step 84, daily price change management software 28 determines whether the day is over. Daily price change management software 28 compares the current time to a threshold time after which all price changes should have been executed for the day. If not, operation returns to step 72 to go through daily price change data file 34 again. If so, operation ends in step 86.

Advantageously, daily price change management software 28 allows a store to aggressively market its products by changing prices on a daily basis. Also, daily price change management software 28 can create daily price change data file 34 without requiring changes to existing price management systems, including the PLU data files 44.

Although the present invention has been described with particular reference to certain preferred embodiments thereof, variations and modifications of the present invention can be effected within the spirit and scope of the following claims.

I claim:

1. A method of applying a price change for an item comprising the steps of:
   (a) reading a record for the item in a first file containing price information for a plurality of items including the item;
   (b) reading a second file to determine that the item is associated with an electronic price label;
   (c) obtaining first price change information including a new price, a date, a start time, and an end time from the record in the first file;
   (d) comparing the first price change information to second price change information in a third file different from the first file and containing prices from the first file scheduled in the first file to change on the date in the first price change information to determine whether the first price change information is already stored within the third file;
   (e) if the first price change information is not already stored within the third file, storing the first price change information in the third file; and
   (f) continuously processing the first price change information in the third file including the substeps of:
      (f-1) determining a present time and a present date;
      (f-2) comparing the present date to the date in the first price change information in the third file;
      (f-3) if the present date is after the date in the first price change information in the third file, deleting the first price change information from the third file;
      (f-4) if the present date is not after the date in the first price change information in the third file, comparing the present time to the start time in the first price change information in the third file to determine whether the first price change information should be started;
      (f-5) if the first price change information should be started, reading the first price change information from the third file instead of the first file and sending a message to the electronic price label at about the start time on the date in the first price change information in the third file including a first command to display the new price;
      (f-6) if the first price change information has been started, comparing the present time to the end time in the first price change information in the third file to determine whether the first price change information should be stopped; and
      (f-7) if the first price change information should be stopped, sending a second message to the electronic price label at about the end time on the date in the first price change information in the third file including a second command to display a regular price for the item.

2. A system for applying a price change for an item comprising the steps of:
   an electronic price label associated with the item; and
   a computer for reading a record for the item in a primary price file, for obtaining first price change information for the item from the record including a new price and a date and a start time and an end time, for maintaining a secondary price file which is a smaller than the price file and which contains daily price change information, for adding the first price change information to the secondary price file, for removing second price change information whose start date is earlier than a current date, for processing the first price change information in the secondary price file by reading the first price change information from the secondary price file on the date in the first price change information, for sending a first message to the electronic price label at about the start time on the date in the price change information in the secondary price file including a command to display the new price wherein the computer schedules the first message during sending, and sending a second message to the electronic price label at about the end time on the date in the price change information in the secondary price file including a command to display a regular price for the item from the secondary price file wherein the computer schedules the second message during sending.

3. A method of applying price change for an item comprising the steps of:
   (a) creating a secondary price file from a primary price file, including the substeps of
      (a-1) reading a record for the item in the primary price file;
      (a-2) determining a price change information portion in the record for the item including a new price, a date, a start time, and an end time;
      (a-3) obtaining the price change information portion from the from the primary price file; and
      (a-4) storing the price change information portion in a new record for the item in the secondary price file;
   (b) reading price change information for the item from the new record in the secondary price file instead of the primary price file on the date; and
   (c) sending a message to an electronic price label associated with the item at about the start time on the date including a command to display the new price.

4. The method as recited in claim 3, wherein the secondary price file is a subset of the primary price file and contains daily price change information.

5. A system for applying a price change for an item comprising the steps of:
   an electronic price label associated with the item; and
   a computer
      for creating a secondary price file from a primary price file by
         reading a record for the item in the primary price file,
         determining a price change information portion in the record for the item including a new price, a date, a start time, and an end time, obtaining the price change information portion from the from the primary price file; and storing the price change information portion in a new record for the item in the secondary price file;

for reading price change information for the item from the new record in the secondary price file instead of the primary price file on the date; and for sending a message to an electronic price label associated with the item at about the start time on the date in the secondary price file including a command to display the new price.

* * * * *